United States Patent [19]

Guggenmos et al.

[11] Patent Number: 6,076,505
[45] Date of Patent: Jun. 20, 2000

[54] FUEL INJECTION ARRANGEMENT FOR A MULTICYLINDER INTERNAL COMBUSTION ENGINE

[75] Inventors: Achim Guggenmos, Esslingen; Janusz Kwiatowski, Stuttgart, both of Germany

[73] Assignee: DaimlerChrysler AG, Stuttgart, Germany

[21] Appl. No.: 09/229,421

[22] Filed: Jan. 14, 1999

[30] Foreign Application Priority Data

Jan. 15, 1998 [DE] Germany .......................... 198 01 171

[51] Int. Cl.[7] .................................................. F02M 41/00
[52] U.S. Cl. ...................... 123/456; 123/195 C; 123/468
[58] Field of Search .................... 123/456, 468, 123/469, 470, 195 C

[56] References Cited

U.S. PATENT DOCUMENTS

| 3,521,726 | 7/1970 | Freyn ................................... 123/195 C |
| 4,230,087 | 10/1980 | Abe et al. ............................. 123/195 C |
| 4,669,443 | 6/1987 | Oetting et al. ........................ 123/195 C |
| 5,211,149 | 5/1993 | Degrace, Jr. ............................. 123/456 |
| 5,363,825 | 11/1994 | Becker ..................................... 123/456 |
| 5,533,485 | 7/1996 | Bronkal . | |
| 5,746,168 | 5/1998 | Lochbrunner et al. ............. 123/195 C |
| 5,896,837 | 4/1999 | Nysten et al. ....................... 123/195 C |

FOREIGN PATENT DOCUMENTS

| 24 39 593 | 2/1976 | Germany ................................ 123/468 |
| 0 154 173 | 3/1982 | Germany ........................... 123/195 C |
| 195 36 459 A1 | 4/1995 | Germany . |
| 44 24 165 | 10/1995 | Germany . |
| 94 10 232 | 12/1995 | Germany . |
| 5-195906 | 8/1993 | Japan ..................................... 123/468 |
| 6-147053 | 5/1994 | Japan ..................................... 123/469 |
| 2 317 646 | 4/1998 | United Kingdom . |

Primary Examiner—Erick Solis
Attorney, Agent, or Firm—Klaus T. Bach

[57] ABSTRACT

In a fuel injection arrangement for a multi-cylinder internal combustion engine including an engine block with a cylinder head defining combustion chambers and a cylinder head cover wherein the cylinder head has cavities receiving fuel injectors which extend downwardly into the combustion chamber for injecting fuel and upwardly into recesses formed in the side wall of the cylinder head, a fuel distribution rail extends over, and is connected to, the fuel injectors, and the cylinder head cover has an extension projecting sidewardly over the fuel injectors and the fuel distribution rail so as to form a protective shield.

8 Claims, 3 Drawing Sheets

FUEL INJECTION ARRANGEMENT FOR A MULTICYLINDER INTERNAL COMBUSTION ENGINE

BACKGROUND OF THE INVENTION

The invention relates to a fuel injection arrangement for a multi-cylinder internal combustion engine having a cylinder head with cavities receiving fuel injectors which extend into the engines combustion chambers and a fuel distribution rail interconnecting the fuel injectors and being shielded by a cylinder head cover portion.

DE 94 10 232 U1 discloses a fuel injection arrangement for an internal combustion engine wherein the fuel is supplied to a distribution rail from which arched injection lines extend to the respective fuel injectors. The distribution rail is integrated into the wall of a cylinder head cover of the internal combustion engine.

The fuel distribution rail may be disposed fully within the wall of the cylinder head cover or it may be mounted on one side of the wall and project from the wall at one side of the cylinder head cover. If the cylinder head cover consists of aluminum or plastic, the distribution rail may, in the first instance, be cast into the cover or, in the second instance, be formed during the injection molding step. The distribution rail may also be a tube, which is inserted into a reception cavity formed in the cylinder head.

The purpose of such a direct integration of the fuel distribution rail into the cylinder head cover is to counteract vibration accelerations. Also, the fuel distribution rail is to be protected during a vehicle crash accident.

It is the object of the present invention to provide, for a vehicle with preferably transverse engine mount and with a fuel injection arrangement with fuel injectors and a fuel distribution rail interconnecting the injectors disposed, in driving direction, at the front side of the engine, an arrangement wherein the fuel injectors and the fuel distribution rail interconnecting the injectors are protected so that they are safe during a crash.

SUMMARY OF THE INVENTION

In a fuel injection arrangement for a multi-cylinder internal combustion engine including an engine block with a cylinder head defining combustion chambers and a cylinder head cover wherein the cylinder head has cavities receiving fuel injectors which extend downwardly into the combustion chambers for injecting fuel and upwardly into recesses formed in the side wall of the cylinder head, a fuel distribution rail extends over, and is connected to, the fuel injectors and the cylinder head cover has an extension projecting sidewardly over the fuel injectors and the fuel distribution rail so as to form a protection shield.

Preferably the protective cover part is L-shaped in cross-section and has a long leg which is formed integrally with the cylinder head cover and a short leg which engages the cylinder head. Then the protective shield is particularly simple and in-expensive since no additional mounting means are required.

With a predetermined side-gap between the shorter leg of the protective shield and the fuel distribution rail, the fuel distribution rail is relatively well protected during a crash.

The protection can further be improved by reinforcement ribs formed at the inside of the protective shield and limiting deformation of the protective shield. They provide for a stable protection of the fuel distribution rail.

The reinforcement ribs can also act as hold-down structures which hold the fuel distribution rail down onto the injectors and which provides for mounting of the fuel distribution rail onto the fuel injectors.

With the arrangement according to the invention, it is made sure therefore that fuel leakages from the fuel containing distribution rail and the fuel injectors are avoided during a crash. As a result, fuel cannot come into contact with hot exhaust parts of the internal combustion engine, particularly sections of the exhaust pipes mounted to the cylinder head.

The invention will be described in greater detail in the following description on the basis of the accompanying drawings.

DESCRIPTION OF PREFERRED EMBODIMENTS

Figure 1:
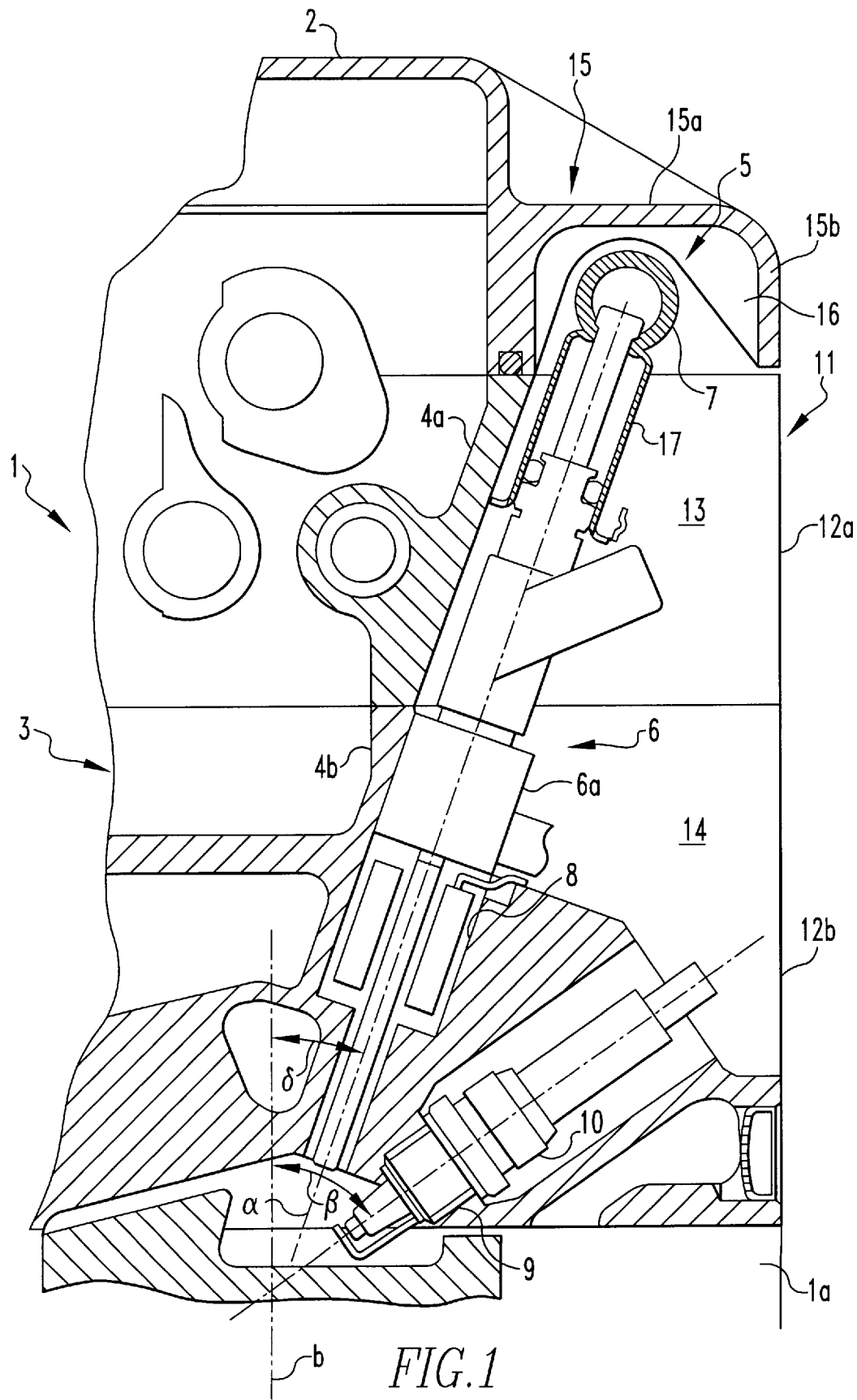
FIG. 1 shows a cylinder head portion comprising two parts forming cavities receiving fuel injectors and a cylinder head cover including a portion extending over the fuel injectors and a distribution rail extending between the injectors.

FIG. 1 shows part of an internal combustion engine 1 having, a cylinder head cover 2, a two-part cylinder head 3 with a cylinder head top part 4a and a cylinder head bottom part 4b disposed on an engine block 1a. The cylinder head 3 further includes a fuel injection arrangement 5 with fuel injectors 6 and a fuel distribution rail 7.

However, although a two-part cylinder head 3 is shown, the cylinder head may consist of a single part.

The two-part cylinder head 3 includes, in the area of the side wall 11 where the exhaust pipes are attached, a first cavity 8 in which the fuel injector 6 is received. The axis a of the fuel injector 6 and the cylinder axis b form an acute angle of about 20°. The cylinder head part 4b further includes second cavity 9 receiving a spark plug 10 having an axis c, which forms with the cylinder axis b an acute angle β of about 55°.

Figure 2:
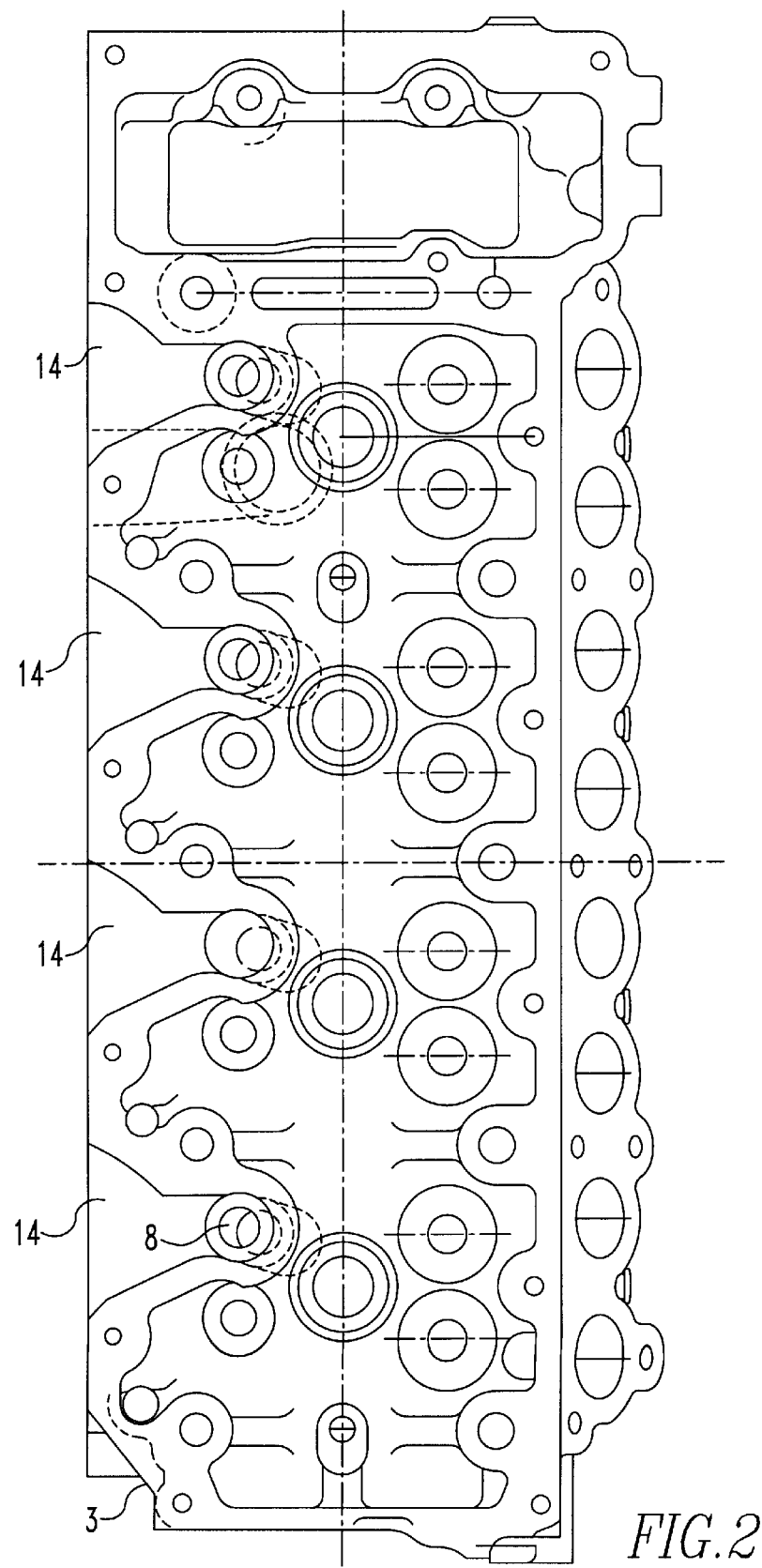
FIG. 2 is a top view of the bottom part of the two-part cylinder head showing the cavities receiving the injectors and, FIG. 3 shows another embodiment of the cylinder head cover.

The cylinder head top part 4a and the cylinder head bottom part 4b are provided at their respective longitudinal side walls 12a and 12b with narrow recesses 13, 14. The lower recess 14 extends downwardly just beyond the cavity 9 for the spark plug 10 and, at the top, conforms with the upper recess 13, which extends upwardly to the cylinder head cover 2. With increasing height, the depth of the recesses 14, 13 (FIG. 1) decreases. In the area of the lower cylinder head part 4b, the recess 14 may become wider toward the longitudinal side wall 11 (FIG. 2).

A part 6a of the fuel injector 6 projects from the first cavity 8 and extends into the cylinder head top part 4a up to the fuel distribution rail 7 to which the fuel injector 6 is connected.

The fuel distribution rail 7 is disposed below the shield portion 15 close to the cylinder head cover so that the shorter leg 15b of the shield portion 15 is spaced from the fuel distribution rail 7 by a distance corresponding about to the diameter of the fuel distribution rail 7. In this way, the fuel distribution rail 7 is protected even with a relatively high deformation of the shield portion 15 as it may occur during a crash.

The shield portion 15 may be a separate part, which is connected on one side to the cylinder head cover 2 and, on the other, to the cylinder head top part 4a.

The shield portion 15 is provided at the inside with reinforcement ribs 16 which extend transversely over the whole width of the shield portion 15. They are shaped so as to extend around the fuel distribution rail 7 in closely spaced relationship therewith. The fuel distribution rail 7 may be mounted by means of retainers 17 mounted on the cylinder head top part 13 (FIG. 1).

Figure 3:
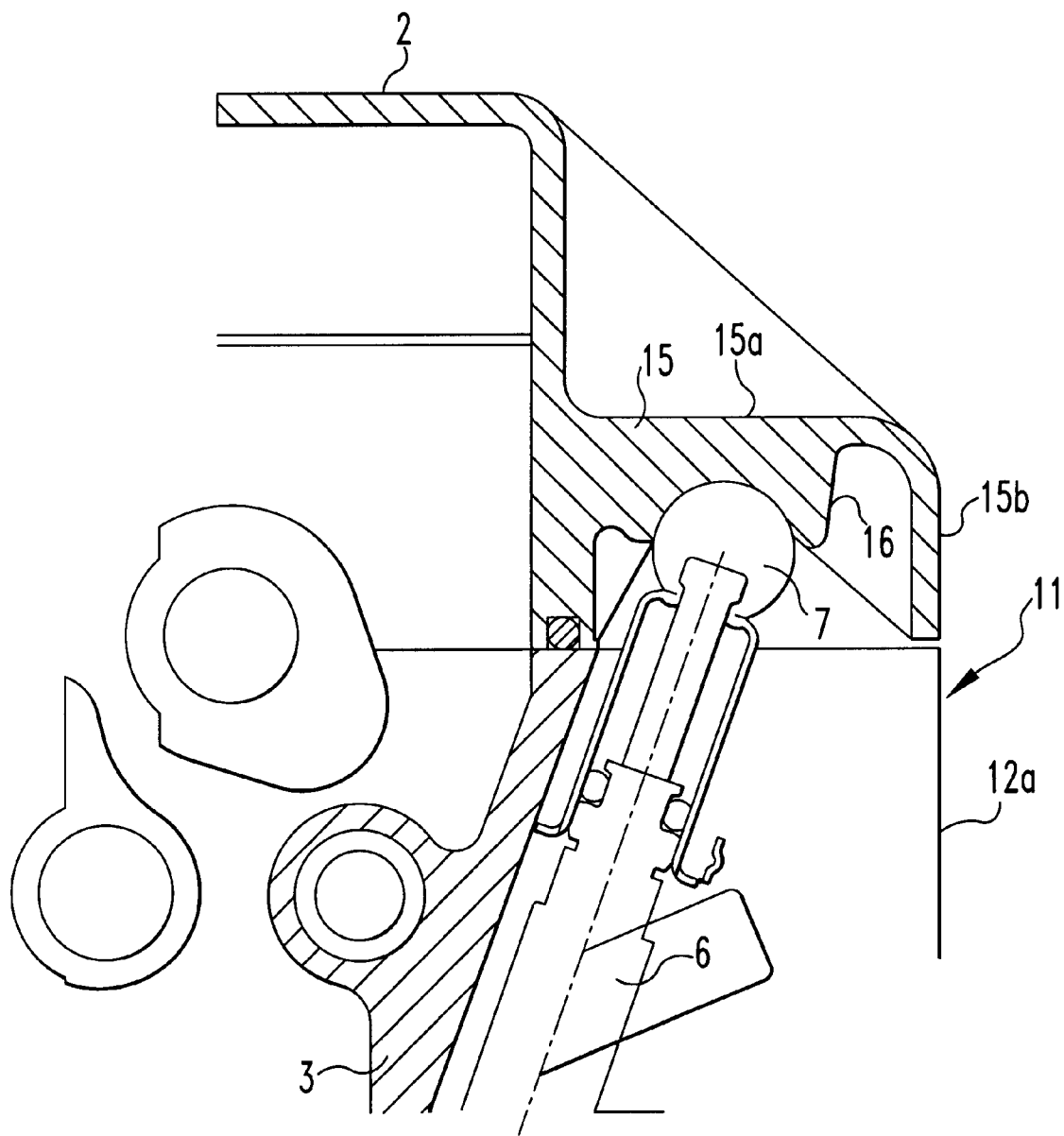

FIG. 3 shows a shield portion 15 with reinforcement ribs 16, which act as hold-down structures pressing the fuel distribution rail 7 onto the fuel injectors 6 and the fuel injector 6 onto the fuel injector seat. In this way, the fuel distribution rail 7 and the fuel injectors 6 are firmly held in position.

With the inclined mounting position of the fuel injection valves 6 and the relatively large distance of the fuel distribution rail 7 from the shorter leg 15b of the shield portion 15, the fuel injector 6, which is disposed deeply within the recesses 13, 14, is protected from damages during a crash. The chances of fuel leakage from fuel conducting parts during a crash and engine compartment fires resulting therefrom are greatly reduced.

What is claimed is:

1. A fuel injection arrangement for a multi-cylinder internal combustion engine including an engine block with a cylinder head defining combustion chambers and a cylinder head cover, said cylinder head having an exhaust side with a side wall having cavities formed therein, and receiving fuel injectors disposed in said cavities and extending into said combustion chambers, said fuel injectors having upwardly projecting portions received in recesses formed in said side walls and a fuel distribution rail extending over said fuel injectors and being connected thereto for supplying fuel to said fuel injectors, said cylinder head cover having at one side thereof an extension projecting over said fuel injectors and said fuel distribution rail so as to form a protective shield.

2. A fuel injection arrangement according to claim 1, wherein said protective shield arches from said cylinder head cover over said injectors and said fuel distribution rail all the way to said cylinder head side wall.

3. A fuel injection arrangement according to claim 2, wherein said protective shield is L-shaped in cross-section, and has a longer leg adjacent said cylinder head cover and a shorter leg disposed above said cylinder head side wall.

4. A fuel injection arrangement according to claim 1, wherein said protective shield is a component attached to said cylinder head cover.

5. A fuel injection arrangement according to claim 3, wherein said shorter leg is disposed at the side of said fuel distribution rail in spaced relationship therefrom at a distance equaling the diameter of said fuel distribution rail.

6. A fuel injection arrangement according to claim 3, wherein said protective shield is elongated and extends over the length of the cylinder head, and transversely extending reinforcement ribs are provided at longitudinally spaced locations and partially surround the fuel distribution rail, said reinforcement ribs extending along said longer leg up to the cylinder head cover and along said shorter leg of said protective shield up to said cylinder head.

7. A fuel injection arrangement according to claim 6, wherein said reinforcement ribs surround said fuel distribution rail with a small clearance.

8. A fuel injection arrangement according to claim 6, wherein said reinforcement ribs engage said fuel distribution rail at one side thereof to hold said fuel distribution rail down in engagement with said fuel injectors.

* * * * *